United States Patent
Belvo et al.

(10) Patent No.: US 6,842,685 B2
(45) Date of Patent: Jan. 11, 2005

(54) TCS STABILITY UTILIZING A CONTROLLED CENTER COUPLING AND CONTROLLED BRAKE SYSTEM

(75) Inventors: Todd A. Belvo, White Lake, MI (US); Eric E. Krueger, Ann Arbor, MI (US); Edmund F. Gaffney, III, Farmington Hills, MI (US)

(73) Assignees: Delphi Technologies, Inc., Troy, MI (US); General Motors Corporation, Detroit, MI (US)

( * ) Notice: Subject to any disclaimer, the term of this patent is extended or adjusted under 35 U.S.C. 154(b) by 61 days.

(21) Appl. No.: 10/383,202

(22) Filed: Mar. 6, 2003

(65) Prior Publication Data

US 2004/0176898 A1 Sep. 9, 2004

(51) Int. Cl.[7] .............................................. B60K 28/16
(52) U.S. Cl. .......................... 701/82; 701/83; 180/197
(58) Field of Search .............................. 701/69, 82, 83, 701/84, 88, 89; 180/197

(56) References Cited

U.S. PATENT DOCUMENTS

| 4,162,712 | A | * | 7/1979 | Nelson ........................ 180/253 |
|---|---|---|---|---|
| 4,989,686 | A | * | 2/1991 | Miller et al. ................. 180/197 |
| 6,247,766 | B1 | | 6/2001 | Subramanian et al. |
| 6,466,857 | B1 | | 10/2002 | Belvo |
| 6,578,648 | B2 | * | 6/2003 | Bell ......................... 180/24.11 |
| 6,591,179 | B1 | | 7/2003 | Check et al. |
| 6,591,937 | B2 | | 7/2003 | Badenoch et al. |
| 6,631,320 | B1 | * | 10/2003 | Holt et al. .................... 701/83 |
| 2002/0070056 | A1 | * | 6/2002 | Wilcox ........................ 180/6.7 |

\* cited by examiner

Primary Examiner—Gary Chin
(74) Attorney, Agent, or Firm—Michael D. Smith

(57) ABSTRACT

A method is directed to controlling a traction control system including a controllable center coupling and a controlled brake system. The method provides for receiving axle speed information, receiving a vehicle speed, determining at least one difference value between the vehicle speed and the axle speed information, and activating the controllable center coupling and the controlled brake system responsive to the difference values. The step of activating the controllable center coupling responsive to at least one of the difference values may include comparing the at least one difference value to at least one associated threshold value, and activating the controllable center coupling based on the comparison. The step of activating the controllable center coupling based on the comparison may include determining an engine torque request value based on the comparison, and engaging an engine with the controllable center coupling based on the engine torque request value.

19 Claims, 2 Drawing Sheets

TCS STABILITY UTILIZING A CONTROLLED CENTER COUPLING AND CONTROLLED BRAKE SYSTEM

FIELD OF THE INVENTION

The technical field of this disclosure is traction-control systems, and more particularly, traction-control systems utilizing a controlled center coupling and an anti-lock brake system.

BACKGROUND OF THE INVENTION

Traction-control is an important aspect of automotive functionality. Many all-wheel-drive (AWD) systems utilize a controlled center coupling that is designed to progressively engage the AWD system and therefore control front-to-rear torque distribution. The normally non-driven axle, referred to as a secondary axle, can be fully locked to the driven axle, referred to as a primary axle. The non-driven axle can be disengaged from the driven axle or partially engaged to the driven axle as well.

Unfortunately, AWD systems are still susceptible to side-to-side wheel spin, on each axle. Side-to-side wheel spin occurs when one wheel on an axle looses traction while the other wheel retains traction. Additionally, AWD systems are still susceptible to all-wheel spin-up. All-wheel spin-up occurs when all wheels of the AWD system loose traction and exceed vehicle speed as a group. Both situations present an undesirable control environment for the AWD system.

It would be desirable, therefore, to provide a system that would overcome these and other disadvantages.

SUMMARY OF THE INVENTION

One aspect of the invention provides a method for controlling a traction control system, including a controllable coupling and an controlled brake system, by receiving axle speed information, receiving a vehicle speed, determining at least one difference value between the vehicle speed and the axle speed information, and activating the coupling and the controlled brake system responsive to the difference values.

In accordance with another aspect of the invention, a computer readable medium storing a computer program includes: computer readable code for determining at least one difference value between vehicle speed and axle speed information, and computer readable code for activating the coupling and the controlled brake system responsive to the difference value.

In accordance with yet another aspect of the invention, a system for controlling a traction control system, including a controllable center coupling and a controlled brake system, is provided. The system includes means for receiving axle speed information. The system further includes means for receiving a vehicle speed. The system additionally includes means for determining at least one difference value between the vehicle speed and the axle speed information. Means for activating the controllable center coupling and the controlled brake system responsive to the difference value is also provided.

The foregoing and other features and advantages of the invention will become further apparent from the following detailed description of the presently preferred embodiment, read in conjunction with the accompanying drawings. The scope of the invention is defined by the appended claims and equivalents thereof, the detailed description and drawings being merely illustrative of the invention rather than limiting the invention.

Throughout the specification, and in the claims, the term "connected" means a direct connection between components or devices that are connected without any intermediate devices. The term "coupled" means either a direct connection between components or devices that are connected, or an indirect connection through one or more passive or active intermediary devices. The term "signal" means either a voltage or current signal.

DETAILED DESCRIPTION OF THE PRESENTLY PREFERRED EMBODIMENT

Figure 1:
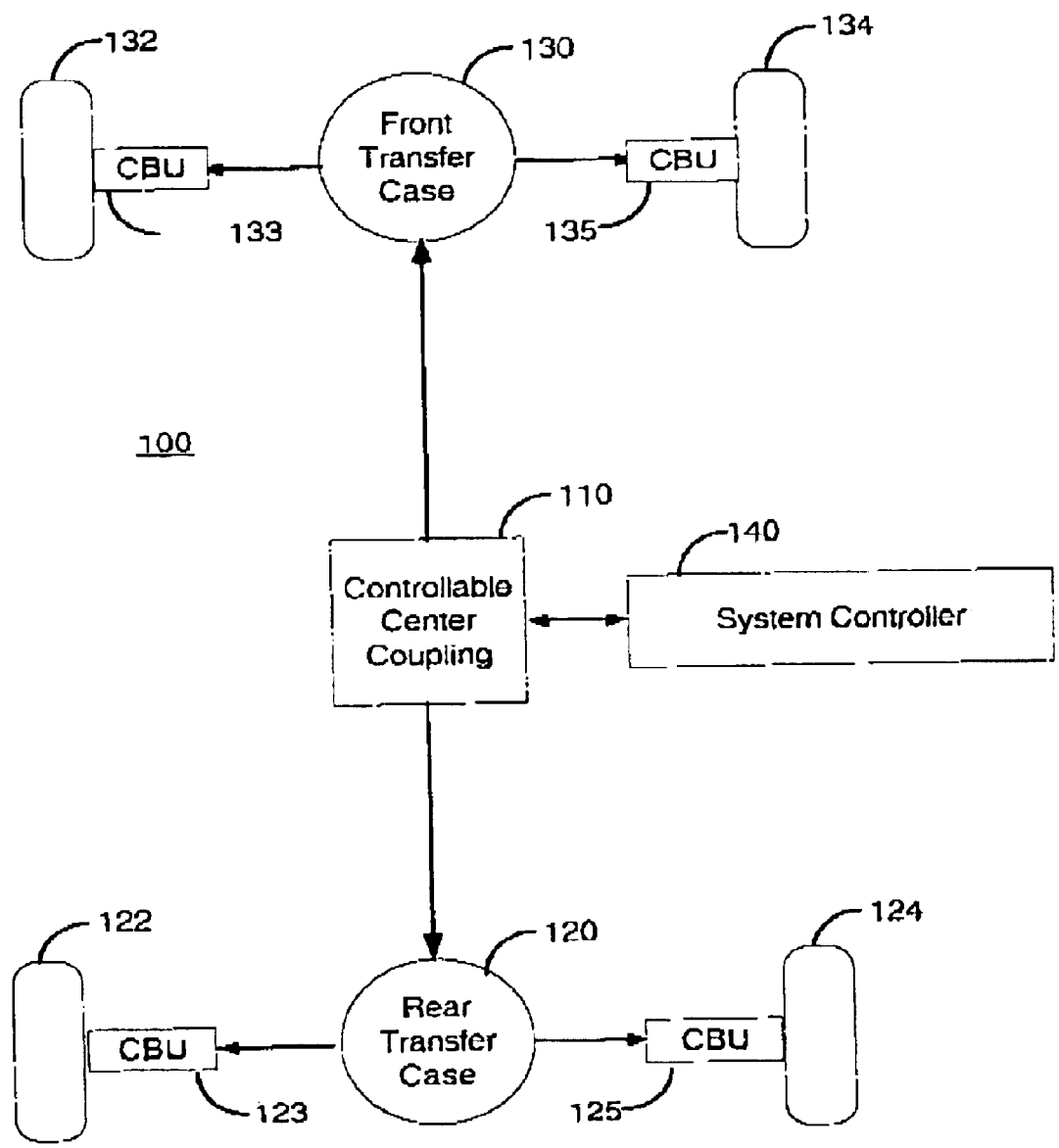
FIG. 1 is a block diagram illustrating an all-wheel drive system, including a controllable central coupling and controlled brake system, according to one embodiment of the present invention.

FIG. 1 is a block diagram illustrating a vehicle drive system 100, including a controllable center coupling configuration, according to one embodiment of the present invention. In FIG. 1, vehicle drive system 100 includes controllable center coupling 110, rear transfer case 120, front transfer case 130, wheel units (122, 124, 132, and 134), and system controller 140. Each wheel unit (122, 124, 132, and 134) includes an associated controlled brake unit (123, 125, 133, and 135). Additionally, a combination of a transfer case, associated wheel units, and associated controlled brake units is called an axle. For example, the combination of front transfer case 130, wheel units (132, 134), and controlled brake units (133, 135) is called a front axle. The combination of rear transfer case 120, wheel units (122, 124), and controlled brake units (123, 125) is called a rear axle.

In one embodiment, vehicle drive system 100 is implemented as an all-wheel drive (AWD) system. In other embodiments, the controllable center coupling is located in other locations for design purposes, such as, closer to the rear transfer case 120 or closer to the front transfer case 130.

Controllable center coupling 110 is mechanically coupled to rear transfer case 120, front transfer case 130, and an engine (not shown). Each transfer case is mechanically coupled to an associated set of wheel units and an associated set of controlled brake units.

In an example, controllable center coupling 110 is implemented as an active transfer case available from Magna Steyr of Graz, Austria. In other examples, controllable center coupling 110 is implemented as a 1TM1 clutch available from Borg-Warner of Chicago, Ill. USA, as a Limited Slip HLSC available from Haldex Hydraulic of Stockholm, Sweden, or as a 120 mm ITCC clutch available from Toyoda of Kariya, Aichi-Pref., Japan. Controllable center coupling 110 may also be referred to as a controllable differential or programmable differential.

In one embodiment, controllable center coupling 110 is electrically coupled to system controller 140. In another embodiment, a controller performing the functions of system controller 140 is included within controllable center coupling 110 and is called a center coupling controller.

"In operation, controllable center coupling 110 receives instructions from system controller 140 and power from the engine (not shown). Controllable center coupling 110 provides torque to one or more transfer cases based on the received instructions. In this embodiment, the amount of torque provided to each axle is responsive to a slip request value that is determined based on individual axle speed comparisons. In one example, the amount of torque provided responsive to the slip request value is implemented as described in U.S. patent application Ser. No. 10/370,001; filed Feb. 20, 2003."

Additionally, controllable center coupling 110 is designed to disengage and reengage from the engine (not shown) when required. In one embodiment, disengagement is required when all wheel units (122, 124, 132, and 134) within vehicle drive system 100 exceed the vehicle speed, such as in a spin up condition. In an example, when all wheel units within vehicle drive system 100 spin up, system controller 140 instructs controllable center coupling 110 to disengage from the engine and allow the wheel units to return to the vehicle speed. Controllable center coupling 110 is then instructed to reengage with the engine. Reducing wheel unit spin up results in improved vehicle drive system 100 control.

Controlled brake units (123, 125, 133, and 135) are part of a controlled brake system. In one embodiment, controlled brake units (123, 125, 133, and 135) additionally include wheel sensors to determine individual wheel unit speeds.

Controlled brake units (123, 125, 133, and 135) receive commands from a brake controller within vehicle drive system 100 and implement the commands to assist in controlling the vehicle. In one embodiment, when less than all of the wheel units (122, 124, 132, and 134) spin up, each controlled brake unit associated with a spun up wheel unit is activated to return the spun up wheel unit to the vehicle speed.

System controller 140 is a control device designed to monitor and receive data from various sources, process the received data, and transmit one or more control signals. In one embodiment, system controller 140 includes hardware and software necessary to implement some or all of the functionality detailed below.

In an example, vehicle drive system 100 includes system controller 140 having a supervisory controller electrically coupled to a brake controller (not shown). Alternatively, the brake controller is included within the supervisory controller. In this embodiment, the supervisory controller receives wheel speed inputs and calculates vehicle speed based on the received wheel speed inputs. The supervisory controller additionally determines coupling levels of the controllable center coupling with the transfer cases and the engine. The supervisory controller also receives and responds to torque coupling requests from the brake controller.

In another embodiment, controllable center coupling 110 includes system controller 140 having all hardware and software necessary to implement vehicle drive system 100 control. In an example, the supervisory controller functionality is performed by a controller within controllable center coupling 110, called a center coupling controller. The center coupling controller performs center coupling torque coupling during wheel spin between controllable center coupling 110 and the transfer cases. The center coupling controller also performs center coupling torque coupling during wheel spin between controllable center coupling 110 and the engine.

The center coupling controller additionally responds to torque coupling requests from the brake controller. In this example, the coupling requests may be used to improve acceleration or stability, or for improving recovery of wheel speeds during TCS events, or for providing the use of the rear wheels to calculate a reference velocity during a TCS event. In this embodiment, the brake controller provides wheel speeds, vehicle speed, and control brake system functions. In an example, the brake controller communicates torque coupling requests to the center coupling controller, and information utilized to determine individual brake unit application to the center coupling controller.

The brake controller (not shown) includes hardware and software necessary to implement all of the controlled brake system functions, including vehicle speed computations and ABS and TCS functions. In one embodiment, the brake controller is located within the brake units. In an example, the center coupling controller and the brake controller are electrically coupled by a communications link. In an example, the communications link is implemented utilizing a high speed serial data bus. In another example, the communications link is implemented utilizing a hardware PWM line. The brake controller is designed to transmit a torque coupling request to the center coupling controller as well as information utilized to determine individual brake unit application. The center coupling controller is designed to respond to the received torque coupling request and individual brake unit application requests.

In another embodiment, system controller 140 is implemented as a central processing unit (CPU) and includes accompanying devices, such as PROMs, and software programming enabling the CPU to conduct operations. Additionally, system controller 140 includes a database having a matrix defining several minimum and maximum values utilized to conduct the operations.

In an example, vehicle drive system 100 is implemented as an AWD system. Either transfer case and associated wheel units and controlled brake units performs primary axle function, such as, for example front transfer case 130 and associated wheel units (132, 134) and controlled brake units (133, 135). The remaining transfer case and associated wheel units and controlled brake units perform secondary axle function, such as, for example rear transfer case 120 and associated wheel units (122, 124) and controlled brake units (123, 125).

In this example, controllable center coupling 110 receives instructions from a system controller 140 and torque from an engine (not shown). Controllable center coupling 110 provides torque to the primary axle and engages the secondary axle as instructed to reduce axle slip and thereby enhance control of the vehicle. In another example, system controller 140 is included within the center coupling performing the same functionality.

"In another embodiment, controllable center coupling 110 within vehicle drive system 100 is utilized to determine vehicle speed. In an example, a secondary axle speed is determined by utilizing the differential disengagement methodology described in U.S. patent application Ser. No. 10/370,001, titled "BRAKE CONTROL METHOD UTILIZING A CONTROLLED CENTER DIFFERENTIAL" filed Feb. 20, 2003. In an example, controllable center coupling 110 is periodically instructed to temporarily disengage the secondary axle to allow the associated wheels to achieve vehicle speed. Axle speed information is then received, for example by controllable center coupling 110, and identified as the secondary axle wheel speed."

In this example, the collected secondary axle speed is then conditioned, such as, for example by profile filtering, rate limiting, concurrent system use filtering, or noise filtering to provide a vehicle speed. The conditioning methods are applied individually, or in any suitable combination and may be implemented within controllable center coupling 110 or within system controller 140.

In another embodiment, vehicle speed is determined utilizing a longitudinal accelerometer. In yet another embodiment, axle speed information is determined utilizing wheel unit monitoring. In an example, axle speed information is determined utilizing wheel unit monitoring that employs individual or groups of sensors supplying wheel unit speed data to the brake controller. In other examples, the wheel unit speed data is supplied to the center coupling controller within controllable center coupling 110 or to system controller 140 for processing.

In operation, vehicle drive system 100 is capable of determining vehicle speed, controlling the coupling of torque to the axles to aid in axle slippage, controlling the coupling of torque from the engine to the controllable center coupling 110 to aid in wheel spin up, and applying controlled brake action to a specific wheel unit within the controlled brake system to aid in individual wheel control.

Figure 2:
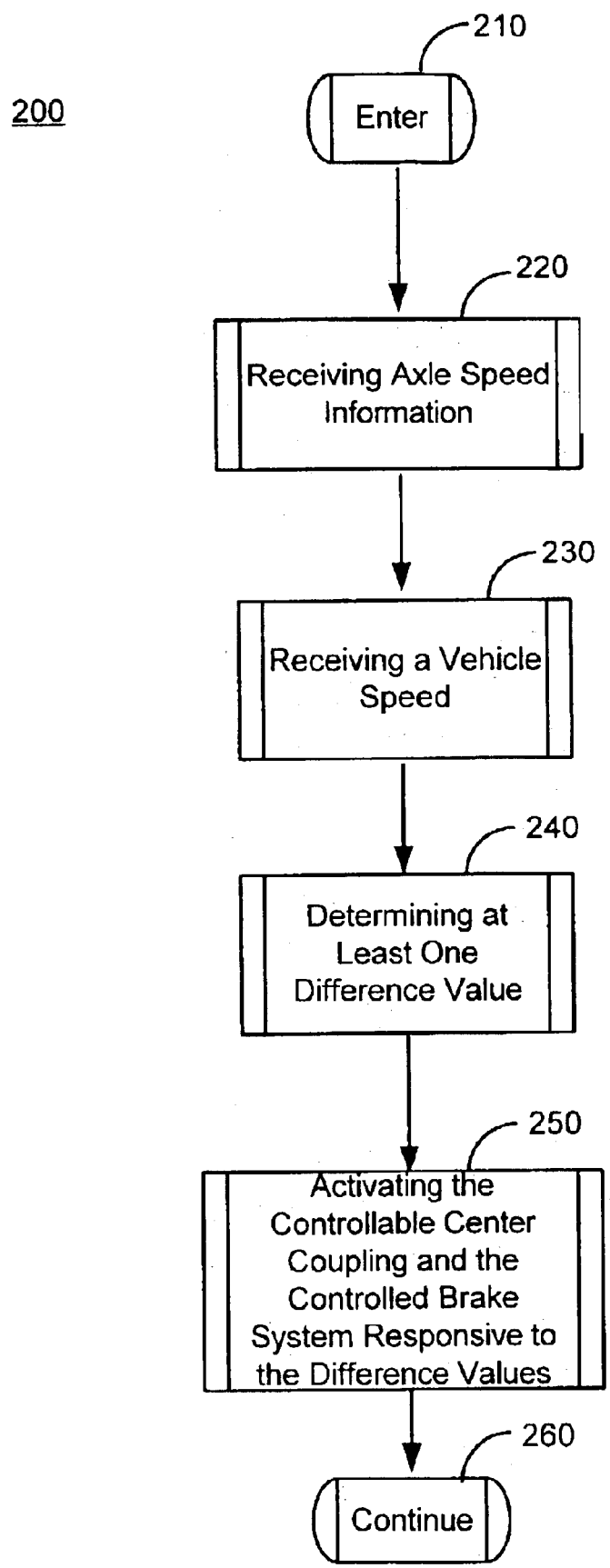
FIG. 2 is a flow diagram illustrating a method for controlling a traction-control system, including a controllable central coupling and an active controlled brake system, according to an embodiment of the present invention.

FIG. 2 is a flow diagram illustrating a method 200 for controlling a center coupling within an active controlled brake system according to an embodiment of the present invention. Method 200 may utilize one or more systems detailed in FIG. 1, above.

Method 200 begins at block 210. At block 220, axle speed information is received. In one embodiment, received axle speed information is primary axle speed, secondary axle speed, or individual wheel unit speeds. In another embodiment, axle speed information is acquired utilizing center coupling disengagement, a longitudinal accelerometer, or wheel unit monitoring.

"In an example, axle speed information is acquired utilizing a differential disengagement methodology described in U.S. patent application Ser. No. 10/370,001, titled "BRAKE CONTROL METHOD UTILIZING A CONTROLLED CENTER DIFFERENTIAL" filed Feb. 20, 2003 and detailed above. In other examples, axle speed information is acquired utilizing wheel unit monitoring or a longitudinal accelerometer as described above".

At block 230, a vehicle speed is received. In one embodiment, receiving the vehicle speed includes receiving the axle speed information and conditioning the axle speed information. In an example, the axle speed information is received as detailed in block 220 above. Conditioning the axle speed information includes utilizing one or more methods, such as, for example profile filtering, rate limiting, concurrent system use filtering, and noise filtering. In this example, the conditioning methods are applied individually, or in any suitable combination and may be implemented within the center coupling or within the system controller.

At block 240, at least one difference value between the vehicle speed and the axle speed information is determined. In an example, a difference value for the primary axle is determined. In other examples, differences values for the secondary axle and each wheel unit are determined.

At block 250, the controllable center coupling and controlled brake system are engaged responsive to the difference values. In one embodiment, engaging the controllable center coupling responsive to the difference value includes comparing the difference value to a threshold value, and engaging the center coupling based on the comparison. In another embodiment, engaging the controlled brake system responsive to the difference value includes comparing the difference value to a threshold value, and engaging the controlled brake system based on the comparison.

In an example, comparing the difference values of the primary axle and the secondary to a slip threshold value results in determination of a slip request value for each axle. In this example, the slip request values activate the controllable center coupling to provide a required torque to each axle based on the slip request values.

In another example, comparing the difference values for each wheel unit to a threshold value results in determination of all wheel spin up when all wheel units difference values exceed the threshold value. In this example, the all wheel units spin up result activate the controllable center coupling to disengage from the engine to allow the wheel units to return to near the vehicle speed.

In yet another example, comparing the difference values for each wheel unit to a threshold value results in determination of less than all wheel spin up when less than all wheel units difference values exceed the threshold value. In this example, the individual wheel units spin up result activate the controlled brake system to engage the associated controlled brake units to allow the effected wheel units to return to near the vehicle speed.

Method 200 advances to block 260 where the method ends.

The above-described method of controlling a traction control system including a programmable controllable center coupling and a controlled brake system is an example method. The method of controlling a traction control system including a controllable center coupling and a controlled brake system illustrates one possible approach for controlling a traction control system including a programmable center coupling and a controlled brake system. The actual implementation may vary from the electronic package discussed. Moreover, various other improvements and modifications to this invention may occur to those skilled in the art, and those improvements and modifications will fall within the scope of this invention as set forth in the claims below.

The present invention may be embodied in other specific forms without departing from its essential characteristics. The described embodiments are to be considered in all respects only as illustrative and not restrictive.

What is claimed is:

1. A method of controlling a traction control system including a controllable center coupling and an controlled brake system, the method comprising:
   receiving axle speed information;
   receiving a vehicle speed;
   determining at least one difference value between the vehicle speed and the axle speed information; and
   activating the controllable center coupling and the controlled brake system responsive to at least one the difference value.

2. The method of claim 1, wherein the axle speed information is selected from the group consisting of: a primary axle speed, a secondary axle speed, and individual wheel unit speeds.

3. The method of claim 1, wherein the axle speed information is acquired from one or more of the group consisting of: differential disengagement, longitudinal accelerometer, and wheel unit monitoring.

4. The method of claim 1, wherein the receiving of the vehicle speed comprises:
   receiving the axle speed information; and
   conditioning the axle speed information.

5. The method of claim 4, wherein the conditioning of the axle speed information includes one or more methods selected from the group consisting of: profile filtering, rate limiting, concurrent system use filtering, and noise filtering.

6. The method of claim 1, wherein the activating of the controllable center coupling responsive to the at least one difference value comprises:

comparing the at least one difference value to at least one associated threshold value; and activating the controllable center coupling based on the comparison.

7. The method of claim 6, wherein the activating of the controllable center coupling based on the comparison comprises:

determining a slip request value based on the comparison;

activating the controllable center coupling with a primary axle responsive to the slip request value; and activating the controllable center coupling with a secondary axle responsive to the slip request value.

8. The method of claim 6, wherein the activating of the controllable center coupling based on the comparison comprises:

determining an engine torque request value based on the comparison; and engaging an engine with the controllable center coupling based on the engine torque request value.

9. The method of claim 1, wherein the activating of the controlled brake system responsive to the at least one the difference value comprises:

comparing the at least one difference value to at least one associated threshold value; and activating at least one controlled brake unit of the controlled brake system based on the comparison.

10. A computer readable medium storing a computer program comprising:

computer readable code for determining at least one difference value between vehicle speed and axle speed information; and computer readable code for activating the controllable center coupling and the controlled brake system responsive to the at least one difference value.

11. The computer readable medium of claim 10, wherein the axle speed information is selected from the group consisting of: a primary axle speed, a secondary axle speed, and individual wheel unit speeds.

12. The computer readable medium of claim 10, wherein the computer readable code for the axle speed information is selected from the group consisting of: differential disengagement, longitudinal accelerometer, and wheel unit monitoring.

13. The computer readable medium of claim 10, wherein the computer readable code for the vehicle speed comprises:

computer readable code for receiving the axle speed information; and computer readable code for conditioning the axle speed information.

14. The computer readable medium of claim 13, wherein the computer readable code for conditioning the axle speed information includes one or more methods selected from the group consisting of: profile filtering, rate limiting, concurrent system use filtering, and noise filtering.

15. The computer readable medium of claim 10, wherein the computer readable code for activating the controllable center coupling responsive to the at least one difference value comprises:

computer readable code for comparing the at least one difference value to at least one associated threshold value; and computer readable code for activating the controllable center coupling based on the comparison.

16. The computer readable medium of claim 15, wherein the computer readable code for activating the controllable center coupling based on the comparison comprises:

computer readable code for determining a slip request value based on the comparison;

computer readable code for activating the controllable center coupling with a primary axle responsive to the slip request value; and computer readable code for activating the controllable center coupling with a secondary axle responsive to the slip request value.

17. The computer readable medium of claim 15, wherein the computer readable code for activating the controllable center coupling based on the comparison comprises:

computer readable code for determining an engine torque request value based on the comparison; and computer readable code for engaging an engine with the controllable center coupling based on the engine torque request value.

18. The computer readable medium of claim 10, wherein the computer readable code for engaging the controlled brake system responsive to the at least one difference value comprises:

computer readable code for comparing the at least one difference value to at least one associated threshold value; and computer readable code for activating at least one portion of the controlled brake system based on the comparison.

19. A system for controlling a traction control system including a controllable center coupling and an controlled brake system, the system comprising:

means for receiving axle speed information;

means for receiving a vehicle speed;

means for determining at least one difference value between the vehicle speed and the axle speed information; and means for activating the controllable center coupling and the controlled brake system responsive to the at least one difference value.

* * * * *